Dec. 24, 1940.   G. KENDE   2,226,245
CAMERA SHUTTER AND MEANS FOR ACTUATING THE SAME
Filed Dec. 3, 1937   2 Sheets-Sheet 2
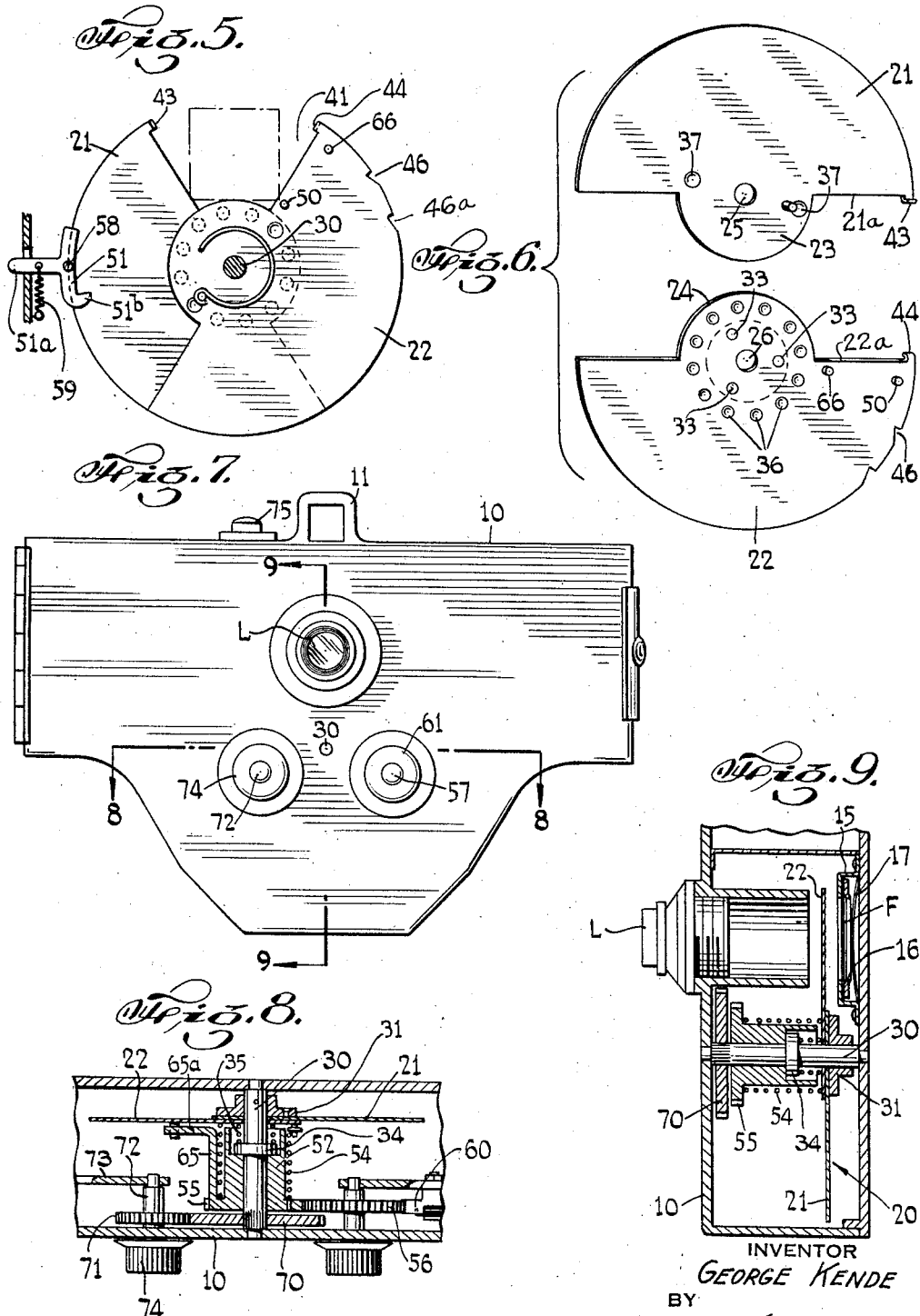
INVENTOR
GEORGE KENDE
BY
ATTORNEY Patented Dec. 24, 1940

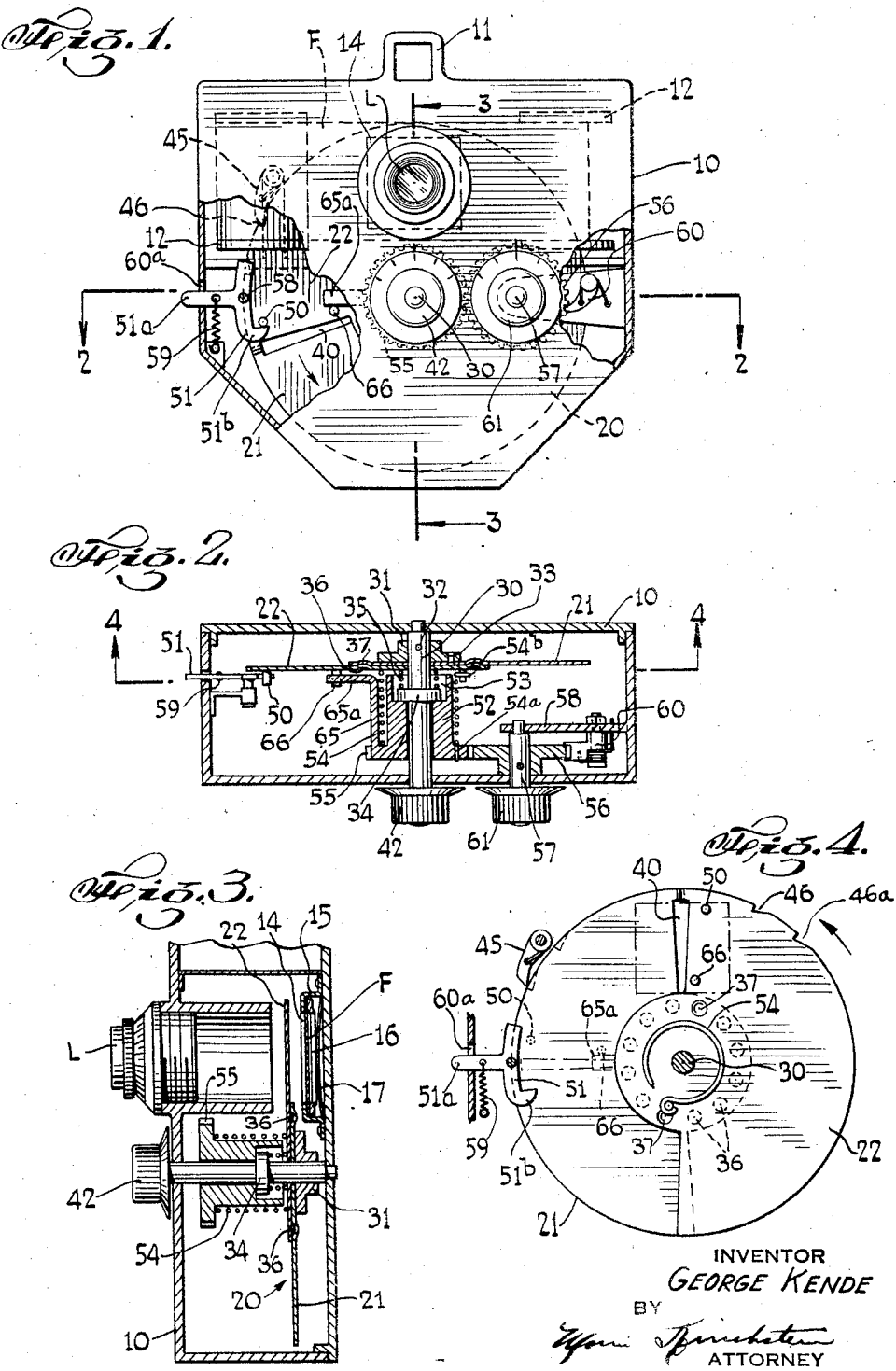

2,226,245

UNITED STATES PATENT OFFICE 2,226,245

CAMERA SHUTTER AND MEANS FOR ACTUATING THE SAME

George Kende, New York, N. Y., assignor, by mesne assignments, to Universal Camera Corporation, New York, N. Y., a corporation of Delaware Application December 3, 1937, Serial No. 177,884

3 Claims. (Cl. 95—61)

This invention relates to cameras. More particularly, this invention relates to an improved construction for a camera shutter.

One of the objects of my invention is to provide a camera shutter of the character described which shall be of the rotatable type and which shall have highly improved means for adjusting the size of the shutter opening.

Another object of my invention is to provide a camera shutter which shall give uniform exposure over the entire film or plate area and to provide this uniform exposure at any one of a wide range of selected shutter speeds.

Another object of my invention is to provide in combination with a camera shutter of the character described, novel means whereby a double exposure of the film will at all times be prevented.

Still another object of my invention is to provide in combination with a camera shutter of the character described improved means for actuating the same.

A still further object of my invention is to provide a camera shutter construction and actuating means therefor, which shall comprise relatively few and simple parts, which shall be easy to assemble, which shall be relatively inexpensive to manufacture, which shall be rugged in construction and which at the same time shall operate with a high degree of efficiency.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention, Fig. 1 is a front elevation, partly sectional, of a camera embodying my invention.

Fig. 2 is a cross-sectional view taken substantially on the line 2—2 of Fig. 1.

Fig. 3 is a cross-sectional view taken substantially on the line 3—3 of Fig. 1.

Fig. 4 is a cross-sectional view taken substantially on the line 4—4 of Fig. 2.

Fig. 5 is a view similar to Fig. 4 but illustrating a wider shutter opening.

Fig. 6 is a disassembled view of the parts that make up the shutter illustrated in Figs. 4 and 5.

Fig. 7 is a front elevational view of a camera illustrating a modified form of my invention.

Fig. 8 is a cross-sectional view taken substantially on the line 8—8 of Fig. 7; and Fig. 9 is a cross-sectional view taken substantially on the line 9—9 of Fig. 7.

Referring now in detail to the drawings, and more particularly to Figs. 1 to 6, there is disclosed a light proof camera casing 10, which may be of any desired shape or form, and provided with a suitable finder 11. The casing 10 is adapted to house a pair of film chambers 12 of desirable construction to properly accommodate a roll of film F causing the same to pass a light aperture 14 of suitable size, by means of any desirable known film actuating mechanism (not shown). As shown in Fig. 3, the film F is guided in a frame 15 past the light aperture 14, and held in proper position by a pressure pad 16 urged into engagement with the back of the film F by means of a spring 17. A suitable lens L is mounted in proper optical alignment with the light aperture 14 and the film F. Mounted for rotational movement between the lens L and the light aperture 14 is a novel shutter 20 constructed in accordance with my invention and which will now be described.

As shown in Fig. 6 the shutter 20 comprises a pair of substantially symmetrical semi-circular plates 21 and 22 provided with ears 23 and 24, respectively. The ears 23 and 24 are provided with apertures 25 and 26 which are so disposed as to be in alignment when the said ears 23 and 24 are positioned in overlapping relationship, as shown in Figs. 4 and 5 of the drawings. The plates 21 and 22 are so designed that when they are placed in overlapping relationship as above described they will form a substantially circular shutter 20 with the aligned apertures 25 and 26 as the axis of rotation thereof.

Referring now to Fig. 2, the overlapping plates 21 and 22 are fixed to a shaft 30 for rotation therewith, said shaft 30 being journalled at opposite ends thereof in the camera casing 10. The means for attaching the shutter 20 to the shaft 30 may comprise a bushing 31 fixed to the shaft 30 by a pin 32 and the shutter plate 21 being in turn fixed to the bushing 31 by any suitable means such as rivets 33. It is thus seen that when the shaft 30 is rotated the plate 21 will be caused to rotate therewith. The plate 22 is held in frictional engagement with the plate 21 so that when the shutter 20 is actuated in the manner soon to be described, the plates 21 and 22 will rotate as a unit together with the shaft 30. To cause such unitary rotation I provide a shoulder 34 on the shaft 30 adapted to abut one end of a spring 35 encircling the shaft 30 and having the other end thereof pressing against the plate 22 urging the same into frictional contact with the plate 21. To further insure the unitary rotation of the plates 21 and 22 there may be provided a plurality of projections 36 in the plate 22 circumferentially disposed with respect to the aperture 26 and designed to be selectively received in detents 37 in the plate 21 correspondingly disposed with respect to the aperture 25. In this way the width of the slot for any given shutter speed is definitely and immovably fixed.

By my novel shutter construction, as above described, I am able to adjust the speed or the opening of the shutter 20 from a relatively slight opening 40, shown in Figs. 1 and 4, to a relatively wide opening 41, shown in Fig. 5. As a matter of fact, the range of adjustability of the shutter opening is substantially from a fraction of a degree to 180 degrees. The arrangement of projections 36 and detents 37 may be such as to provide definite stages of shutter openings.

To effect this adjustment of shutter opening it is merely necessary to relatively rotate the shutter plates 21 and 22. Referring again to Fig. 2 it is seen that if the shaft 30 is rotated, the plate 21 being fixed thereto will rotate with the shaft 30 while the plate 22 is held against rotational movement by a pin 50 and starting lever 51 soon to be described in greater detail. In this way any desired opening size may be obtained. To facilitate the rotation of the shaft 30 for the purpose of adjusting the shutter opening there is provided a knob 42 fixed to a portion of the shaft 30 extending beyond the camera casing wall.

It is noted in Figs. 5 and 6 that a portion of each of the straight edges 21a and 22a of the plates 21 and 22, respectively, adjacent the periphery of the plates is provided with extensions 43 and 44 which are angularly bent so as to abut each other and thus limit the relative rotational movement of the plates 21 and 22 in one direction.

As shown in Fig. 1, it is seen that when the plate 21 is rotated in a counter-clockwise direction to enlarge the shutter opening 40, the plate 22 will be held against rotational movement by the pin 50 and lever 51. However, after the shutter opening 40 has been increased and it is desired to again reduce the size of the opening, the plate 21 would then have to be rotated in a clockwise direction. In such event to avoid the possible tendency of the plate 22 also being rotated, due to the frictional engagement of the plates 21 and 22, I provide a spring pressed pawl 45 adapted to normally engage in a notch 46 adjacent the periphery of the plate 22, which prevents movement of the plate 22 in a clockwise direction.

Suitable mechanism may be provided for actuating the camera shutter, such as for example that shown in the drawings and which will now be described.

Freely mounted on the shaft 30 and independently rotatable with respect thereto is a drum 52 provided with a recessed portion 53 adapted to abut against the shaft shoulder 34. Mounted on the drum 52 is a spring 54, one end 54a of which is fixed to the drum 52 while the other end 54b thereof is fixed to the plate 22 of the shutter 20. Mounted on the drum 52 is a gear 55 which may be integral therewith, if desired. The gear 55 is designed to mesh with a gear 56, mounted on a shaft 57 for rotation therewith, said shaft 57 being journalled in a bearing 58 and in the wall of the camera casing 10. It is thus seen from the above described construction that when the shaft 57 is rotated the gear 56 will drive the gear 55 to rotate the drum 52 and wind the spring 54. A spring pressed pawl 60 is provided which engages the teeth of the gear 56 to prevent the unwinding of the spring 54. To facilitate the rotational movement of the shaft 57 there is provided a knob 61 fixed to a portion of the shaft 57 extending beyond the camera casing 10. After the spring 54 has been wound, the shutter 20 is held against rotational movement by the pin 50 fixed to the plate 22, and the catch lever 51 pivoted at 58 and having an arm 51a extending through a slot 60a in the wall of the casing 10, said casing wall adjacent said slot being rendered light proof in the usual manner well known in the art. A spring 59 normally urges the lip 51b of the lever 51 in the path of the pin 50 and thus prevents the rotational movement of the shutter 20 against the action of the wound spring 54. To limit the amount of the winding of the spring 54 and at the same time to insure against double exposure, there is provided an arm 65 which may be integral with the drum 52, as shown, or which may be attached thereto, and provided with an angularly bent portion 65a in a plane substantially parallel to the plane of the shutter 20. An upwardly projecting pin 66 is fixed to the plate 22 and disposed in the path of the arm portion 65a. It is seen from the above described construction that when the knob 61 is turned in a clockwise direction (see Fig. 1) the drum 52 will rotate in a counter-clockwise direction until the arm portion 65a strikes the pin 66. When this occurs the spring 54 will be sufficiently wound to actuate the shutter 20 for one exposure, and the shutter 20 will be positioned as shown in Fig. 1 with the arm portion 65a above the pin 66. In this position the camera is ready for operation.

To actuate the shutter 20, the arm 51a is moved upwardly against the action of the spring 59 to move the lip 51b out of the path of the pin 50 and due to the action of the spring 54, the shutter 20 will rotate and the opening 40 will be caused to move past the light aperture 14 and continue until the pin 66 strikes the opposite side of the arm portion 65a. In such position it is seen that the arm 51a cannot be caused to operate the shutter 20 until the spring 54 is again wound by means of the knob 61.

The plates 21 and 22 which comprise my shutter are so designed that if the extensions 43 and 44 were removed to permit the shutter to be completely closed the boundary edges of the slot 40 or of the slot 41 would then coincide. This may be accomplished by having the two edges of the shutter opening 40 or 41 radial to the center of rotation, as shown in Figs. 4 and 5 of the drawings. However while such radial form is the simplest construction for edges of the shutter opening, other forms may be employed with equal effectiveness, such as for example, arcuate shaped edges or scalloped edges, the general requirement being that if the shutter blades could be rotated to completely close the shutter opening, the boundary edges of the slot would then coincide.

Taking any infinitely small point on the film area being exposed, it will be seen that this point will be uncovered by a certain definite point on the leading edge of the shutter and covered after the period of exposure by a definite point on the trailing edge, the points on the trailing and leading edge having the same angular and linear velocity. The time of exposure for this point will be equal to the length of arc between the points referred to on the leading and trailing edges of the shutter opening, divided by the linear velocity. It is, therefore readily seen that for uniform exposure of all points on the film area being exposed, the ratio of length of arc to linear velocity must be constant, and this requirement is readily met by having the two edges of the shutter opening radial to the center of rotation.

The camera may be of such design that the action of winding the spring 54 will cause the film to be advanced in readiness for the next exposure, by any suitable mechanism generally known in the art, such as for example by direct gearing from the shutter winding mechanism to a toothed sprocket which engages in perforations in the film (not shown) or by other known types, in which a frictional drive is employed instead of the toothed sprocket, or employing a claw pull down mechanism.

A second notch 46a is provided adjacent the periphery of the plate 22 spaced from the notch 46, to accommodate the pawl 45 after the shutter 20 has been actuated and the pin 66 is positioned on the opposite side of the arm portion 65a from that shown in Fig. 1.

In Figs. 7 to 9 there is shown a modified form of my invention in which the adjustment of the size of the shutter opening, instead of being directly effected by the knob 42 fixed directly to the shaft 30 is arranged as shown in Fig. 8. Fixed to the shaft 30 for rotation therewith is a gear 70 adapted to mesh with a gear 71 fixed to a shaft 72 for rotation therewith. The shaft 72 is journalled at one end thereof in a bearing member 73 and at the other end thereof in the wall of the camera casing 10. It is thus seen that when the shaft 72 is rotated the gear 71 will drive the gear 70 to turn the shaft 30 and thus move the plate 21 with respect to the plate 22 in the manner hereinbefore described in connection with the Figs. 1 to 6 form of my invention. To facilitate the rotation of the shaft 72 there is provided a knob 74 fixed to the end of the shaft 72 extending beyond the camera casing wall.

Instead of the arm 51a employed in the Figs. 1 to 6 form, there may be employed the usual type of push button 75 for releasing the shutter 20 for rotational movement.

While in the drawings I have illustrated my invention as applied to a focal plane type of shutter, it is understood that my invention may also be satisfactorily applied to other types of camera shutters.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In a camera, a rotatably mounted shutter comprising a pair of plates having overlapping ears, apertures in said ears in registered alignment, a shaft received in said registered apertures, means for causing relative rotational movement of said plates upon rotation of said shaft to vary the size of the shutter opening, means for actuating said shutter, said last named means comprising a spring, having one end thereof fixed to said shutter and the other end thereof fixed to a drum, means for winding said spring, and means for limiting the amount of winding of said spring, said last named means comprising an abutment member on said shutter and cooperating means on said drum adapted to prevent further rotational movement of said drum after said cooperating means engages said abutment member.

2. In a camera, a rotatably mounted shutter comprising a pair of plates having overlapping ears, apertures in said ears in registered alignment, a shaft received in said registered apertures for supporting said plates, means for causing relative rotational movement of said plates to vary the size of the shutter opening, said last named means comprising means for fixedly attaching one of said plates to said shaft for rotation therewith, a spring drum journalled on and rotatable with respect to said shaft, means comprising a spring for actuating said shutter, said spring being supported on said drum, means for attaching one end of said spring directly to said shutter for rotation therewith, the other end of said spring being fixed to said drum for rotation therewith, said drum and said spring being concentrically disposed with respect to said shaft, and means comprising a pair of meshing gears for winding said spring.

3. In a camera, a rotatably mounted shutter comprising a shaft and a first and second member mounted on said shaft, means for causing relative angular movement of said members to vary the size of the shutter opening, said last named means comprising means to fixedly attach one of said members to said shaft for rotation therewith, and means to maintain said members in various selective angular relationships, said means comprising a spring pressed projection on said first member adapted to selectively cooperate with a plurality of recesses in said second member, said recesses being spaced apart pre-determined distances in accordance with desired shutter openings, said projection being adapted to ride on the face of said second member between said recesses, whereby said projection will drop into a selected recess when said members are in pre-determined desired angular relationship.

GEORGE KENDE.